United States Patent
Tanaka et al.

(10) Patent No.: US 6,504,638 B1
(45) Date of Patent: *Jan. 7, 2003

(54) OPTICAL AMPLIFYING TRANSMISSION SYSTEM AND OPTICAL AMPLIFIER

(75) Inventors: Keiji Tanaka, Tokyo (JP); Noboru Edagawa, Tokyo (JP); Hidenori Taga, Tokyo (JP); Shu Yamamoto, Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/206,512

(22) Filed: Dec. 7, 1998

(30) Foreign Application Priority Data

Dec. 11, 1997 (JP) ............................................. 9-341112

(51) Int. Cl.[7] ........................ H04B 10/16; H04B 10/02; H04B 10/12; H04J 14/02; H01S 3/00
(52) U.S. Cl. ........................ 359/179; 359/124; 359/161; 359/174; 359/333; 359/341.1; 359/341.3
(58) Field of Search .............................. 359/124, 161, 359/174, 176, 333, 341, 179, 341.1, 341.3

(56) References Cited

U.S. PATENT DOCUMENTS

| | | | | |
|---|---|---|---|---|
| 5,323,260 A | * | 6/1994 | Alfano et al. | 359/244 |
| 5,499,134 A | * | 3/1996 | Galvanauskas et al. | 359/333 |
| 5,572,355 A | * | 11/1996 | Cotton et al. | 359/333 |
| 6,081,355 A | * | 6/2000 | Sharma et al. | 359/110 |
| 6,115,173 A | * | 9/2000 | Tanaka et al. | 359/333 |

* cited by examiner

Primary Examiner—Leslie Pascal
Assistant Examiner—M. R. Sedighian
(74) Attorney, Agent, or Firm—Christie, Parker & Hale, LLP

(57) ABSTRACT

To increase the number of multiplexed wavelengths and to improve transmission characteristics in a wavelength-division-multiplexed transmission, a bandwidth compressor for bandwidth-compressing the wavelength-division-multiplexed signal light is disposed at a front part of respective optical amplifiers and a bandwidth expander for bandwidth-expanding the wavelength-division-multiplexed signal light output from said optical amplifiers is disposed at a rear part of said optical amplifiers.

18 Claims, 4 Drawing Sheets

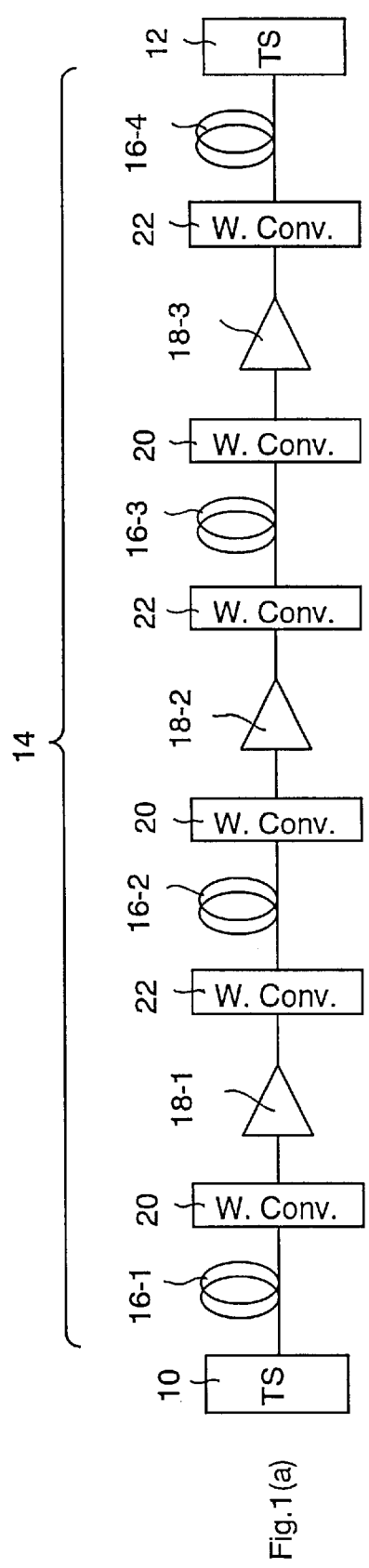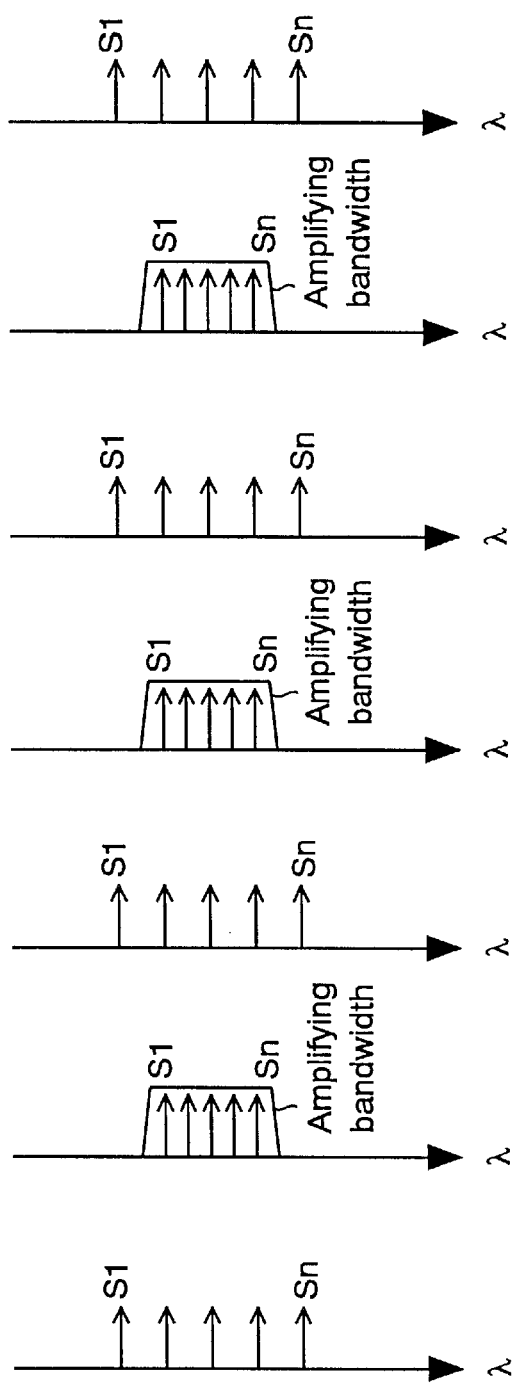
Fig.1(a)
Fig. 1(b)

OPTICAL AMPLIFYING TRANSMISSION SYSTEM AND OPTICAL AMPLIFIER

FIELD OF THE INVENTION

This invention relates to an optical amplifying specifically, to an optical amplifying transmission system for optically amplifying and transmitting a wavelength-division-multiplexed light and an optical amplifier therefor.

BACKGROUND OF THE INVENTION

Because a transmission bandwidth of an optical fiber transmission line is generally wider than an amplifying bandwidth of an optical amplifier, in conventional art, a signal bandwidth is determined by an amplifying bandwidth of an optical amplifier. Furthermore, the interaction between channels such as XPM (Cross Phase Modulation) and FWM (Four Wave Mixing) exist on an optical fiber transmission line causing deterioration of transmission characteristics and, therefore, a channel interval (relative to a wavelength; the following are the same unless noted.) has been conventionally taken wide enough so that the interaction between channels on an optical fiber transmission line can be neglected.

As described above, in conventional art, it is always required to have a wider channel interval. The number of multiplexed wavelengths is determined by the wavelength interval and an amplifying bandwidth of an optical amplifier and, consequently, the primary object of research generally has been aimed at how to widen an amplifying bandwidth of an optical amplifier.

SUMMARY OF THE INVENTION

An object of the invention is to provide an optical amplifying transmission system and an optical amplifier which, keeping a wide channel interval, are capable of wavelength-division-multiplexing much more wavelengths.

A further object of the invention is to provide an optical amplifying transmission system and an optical amplifier which can increase the number of multiplexed wavelengths without widening an optical amplifying bandwidth.

In an optical amplifying transmission system according to the invention, a bandwidth compressor for compressing a bandwidth occupied by inputting wavelength-division-multiplexed signal lights and for supplying it to an optical amplifier, is disposed at a front part of said optical amplifier, and a bandwidth expander for expanding the bandwidth occupied by the signal lights output from said optical amplifier is arranged at a rear part of said optical amplifier.

By using the above-mentioned structure, a transmission bandwidth of an optical fiber transmission line and an amplifying bandwidth of an optical amplifier can be determined independently and, as a result, it becomes possible to have a channel interval on an optical fiber transmission line wide enough not to be affected by the interaction between channels, being unrelated to the amplifying bandwidth of the optical amplifier. As the signal lights can be arranged densely within the amplifying bandwidth of the optical amplifier, the number of the multiplexed wavelengths can be increased remarkably and, therefore, the bandwidth of the amplifier can be used effectively. Since there is no need to expand the optical amplifying bandwidth expressly, each signal light can easily obtain a regular gain and, accordingly, gain equalization becomes unnecessary or easy to apply even if necessary. The irregularities of the optical amplifying bandwidths of the optical amplifier can be compensated relatively easily using the wavelength converting function of the bandwidth compressor and the bandwidth expander.

The bandwidth compressor comprises a divider for dividing a inputting wavelength-division-multiplexed signal light into a plurality of groups and a relocator for relocating respective groups of the signal lights divided by the divider, without overlapping each other, within a bandwidth narrower than the original bandwidth and, thus, the bandwidth of the wavelength-division-multiplexed signal light can be compressed by a simple structure.

The relocator comprises a wavelength converter for wavelength-converting each group in a lump except for at least one group in the plurality of groups divided by said divider and a multiplexer for wavelength-multiplexing each group of the signal lights wavelength-converted by the wavelength converter as well as each group of the signal lights which has not wavelength-converted and, therefore, the bandwidths can be compressed effectively using the few wavelength converters.

BRIEF DESCRIPTION OF THE DRAWING

FIG. 1(a) is a schematic block diagram showing a first embodiment of the invention;

FIG. 1(b) shows wavelength positions of signal lights at respective parts;

DESCRIPTION OF THE PREFERRED EMBODIMENTS

Some embodiments of the invention are explained below in detail with reference to the drawings.

FIG. 1(a) is a schematic block diagram of a first embodiment of the invention and FIG. 1(b) shows wavelength positions of signal lights at respective parts. In FIG. 1(b), the vertical axis and the horizontal axis respectively show a wavelength and the optical intensity.

In an optical fiber transmission line 14 positioned between terminal stations 10 and 12, numerals 16-1~16-4 denote transmission optical fibers and numerals 18-1~18-3 denote optical amplifiers. A bandwidth compressor 20 for compressing a bandwidth occupied by a wavelength-division-multiplexed signal light is inserted at a front part of the respective optical amplifiers 18-1~18-3 and a bandwidth expander 22 for expanding the bandwidth occupied by the signal light is inserted at a rear part of the respective optical amplifiers 18-1~18-3. The bandwidth compressor 20, one of the optical amplifiers 18-1~18-3 and the bandwidth expander 22, as a whole, compose an optical amplifying repeater.

The terminal station 10 outputs wavelength-division-multiplexed signal lights S1~Sn to the transmission optical fiber 16-1 in a wavelength interval wide enough to be able to neglect the interactive influence between channels. The wavelength compressor 20 narrows the wavelength interval and compresses the bandwidth so that a wavelength of the respective signal lights S1~Sn from the transmission optical fiber 16-1 fits in the amplifying bandwidth of the optical amplifier 18-1. Accordingly, the respective signal lights S1~Sn are disposed densely within the amplifying bandwidth of the optical amplifier 18-1. In the optical amplifier 18-1, interference between the channels can be neglected as far as wavelengths of different signal lights do not overlap each other. Therefore, the amplifying bandwidth of the optical amplifier 18-1 can be much narrower than the transmission bandwidth of the transmission optical fiber 16-1 unless the wavelengths of the respective bandwidth-compressed signal lights S1~Sn do not overlap each other. That is, the amplifying bandwidth of the optical amplifier 18-1 can be fully narrower than the transmission bandwidth of the transmission optical fiber 16-1.

The bandwidth expander 22 bandwidth-expands the respective signal lights S1~Sn output from the optical amplifier 18-1 and restores them to the original wavelengths. An output light of the bandwidth expander 22 transmits on the transmission optical fiber 16-2 and enters the following bandwidth compressor 20. The rest operates in the same way as stated above.

Figure 2:
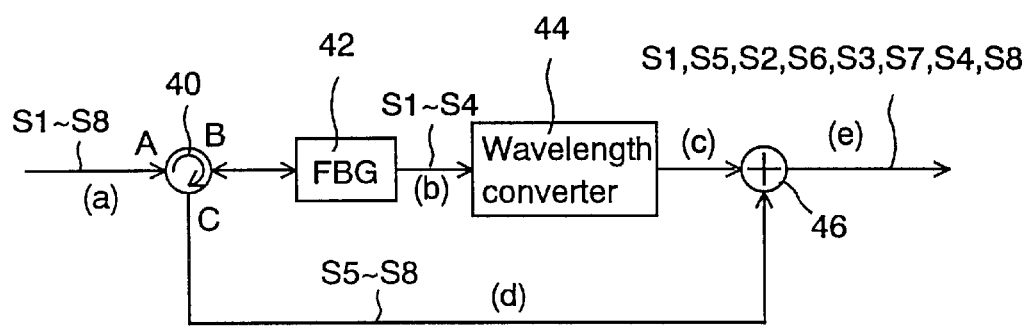
FIG. 2 is a schematic block diagram of a bandwidth compressor 20.

As a bandwidth compressing/expanding function, there is means, for example, that narrows and widens a channel interval by wavelength-demultiplexing a wavelength-division-multiplexed light to each signal light and individually converting each signal light into a desired wavelength within an aimed wavelength band. However, the function can be also realized by a circuit structure shown in FIG. 2. In FIG. 2, eight signal lights S1~Sn should be wavelength-division-multiplexed.

An optical circulator 40 is an optical element which outputs an input light of a port A from a port B and outputs an input light of the port B from a port C. A wavelength-division-multiplexed light of the eight signal lights enters the port A. An optical fiber grating 42 for selectively reflecting the wavelengths of the signal lights S5~S8 is connected to the port B of the optical circulator 40. The other end of the optical fiber grating 42 is connected to a wavelength converter 44 for wavelength-converting or wavelength-shifting, in a lump, the signal lights S1~S4 transmitted through the optical fiber grating 42. Both an output light of the wavelength converter 44 and an output light (the signal lights S5~S8) of the port C of the optical circulator 40 are applied to a multiplexer 46. The multiplexer 46 multiplexes, namely wavelength-multiplexes, both input lights.

Figure 3:
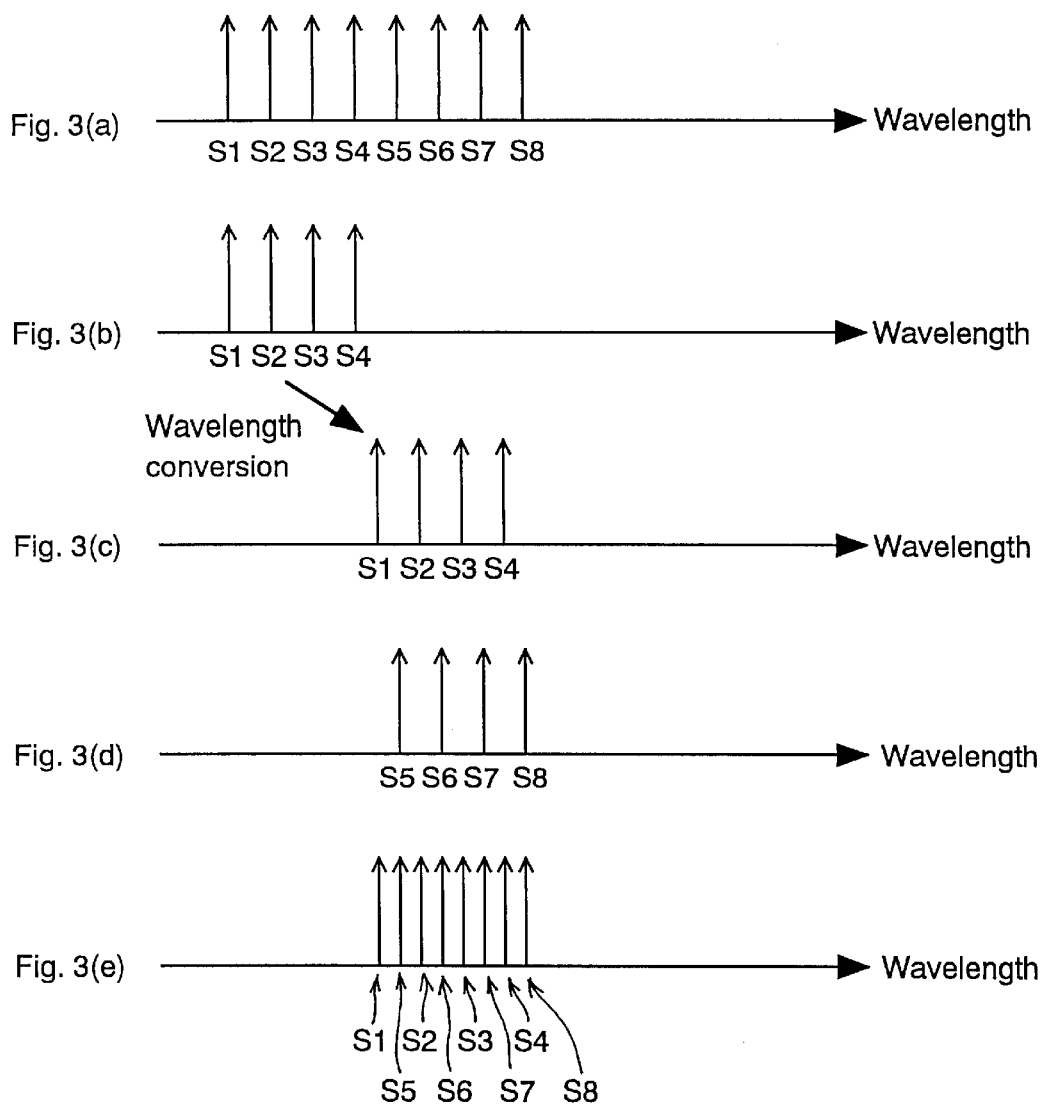
FIGS. 3(a)~(e) are wavelength distribution maps of signal lights at the respective parts of the apparatus shown in FIG. 2.

FIGS. 3(a)~(e) show the signal wavelength distribution of 10 each part shown in FIG. 2. FIG. 3(a) shows the signal wavelength distribution of an input light of the port A of the optical circulator 40, FIG. 3(b) shows that of an input light of the wavelength converter 44. FIG. 3(c) shows that of an output light of the wavelength converter 44, FIG. 3(d) shows that of an output light of the port C of the optical circulator 40 and FIG. 3(e) shows that of an output light of the multiplexer 46.

The wavelength-division-multiplexed signal lights S1~S8 (FIG. 3(a)) input the port A of the optical circulator 40 and enter the optical fiber grating 42 through the port B. As shown in FIG. 3(b), the signal lights S1~S4 are applied to the wavelength converter 44 after transmitting the optical fiber grating 42 and, on the other hand, the signal lights S5~S8 are reflected by the fiber grating 42, input to the port B of the optical circulator 40 and applied, as shown in FIG. 3(d), to the multiplexer 46 from the port C. The wavelength converter 44 wavelength-shifts the inputting signal lights S1~S4 (FIG. 3(b)) in a lump so as to fit in the respective channel intervals of the signal lights S5~S8 as shown in FIG. 3(c). The multiplexer 46 multiplexes, namely wavelength-multiplexes, an output light of the wavelength converter 44 and an output light of the port C of the optical circulator 40 and outputs them. In the output light of the multiplexer 46, the signal lights S1~S8 are lined S1, S5, S2, S6, S3, S7, S4 and S8 in that order and the channel intervals are compressed into half of the original intervals.

By using the wavelength converter 44 which wavelength-shifts the signal lights from the position shown in FIG. 3(c) to the position shown in FIG. 3(b), it is obvious that the bandwidth expanding function can be realized by the structure shown in FIG. 2. In this case, the optical fiber grating 42 should comprise the fiber gratings connected in series for selectively reflecting the respective wavelengths of the signal lights S1~S4.

If a plurality of signal lights are grouped and wavelength-converted in a lump at the bandwidth compression, the divided signal lights can be multiplexed in a same group and then wavelength-converted in a lump at the wavelength expansion. By this structure, the number of wavelength converters can be reduced.

Figure 4:
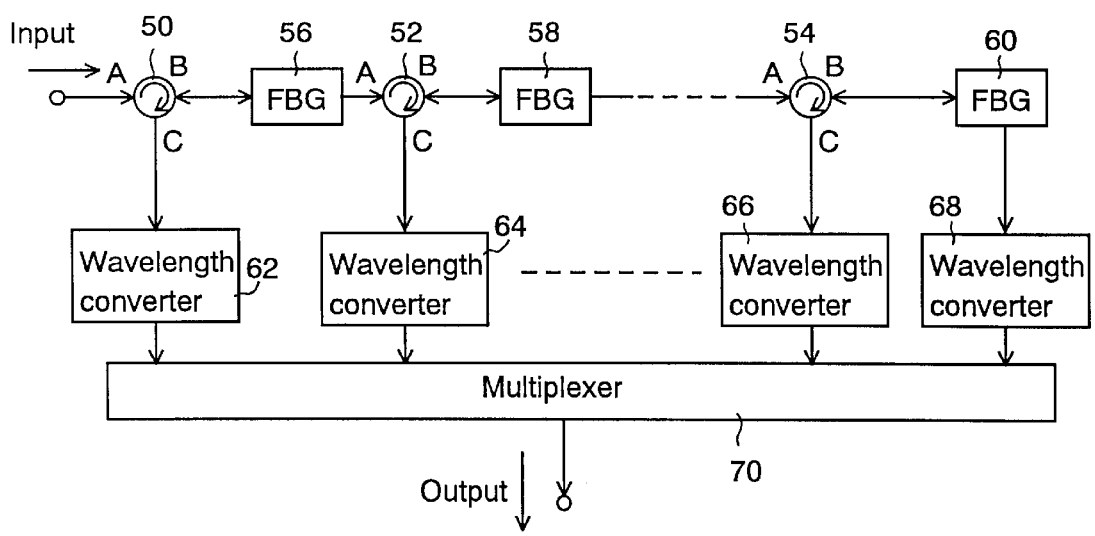
FIG. 4 is a schematic block diagram of a bandwidth compressor/expander.

The bandwidth compressor 20 and the bandwidth expander 22 generally can be realized by the circuit structure shown in FIG. 4. In a circuit structure that optical circulators 50, 52 and 54 and optical fiber gratings 56, 58 and 60 for selectively reflecting desired wavelengths are connected in series, signal lights of respective wavelengths are divided from an input light, and then wavelength converters 62, 64, 66 and 68 shift the respective signal lights into desired wavelengths. A multiplexer 70 multiplexes, namely wavelength-multiplexes, output lights of the wavelength converters 62, 64, 66 and 68. It is apparent that well-known arrayed waveguide gratings and optical filters can be used as the alternatives to the part composed of the optical circulators 50, 52 and 54 and the optical fiber gratings 56, 58 and 60. The arrayed waveguide grating can be also used as the multiplexer 70. The wavelength converters 62~68 obviously can be omitted for signal lights which are no need to be wavelength-shifted. The circuit shown in FIG. 4 can be used as both bandwidth compressors and bandwidth expanders by adjusting the amount of wavelength-shifting of the wavelength converters 62, 64, 66 and 68.

The wavelength converters 44, 62, 64, 66, and 68 can be realized, for example, using the nonlinear optical effect such as DFG (Difference Frequency Generation) and FWM, the principle of electroacoustic frequency shifter and an electro-absorption modulator or a semiconductor laser amplifier. Moreover, it is also possible to combine them. Consequently, a wavelength shift of 20~30 nm can be realized.

In the embodiment, the bandwidth of the transmission optical fibers 16-1~16-4 and that of the optical amplifiers 18-1~18-3 can be determined individually. Hence, it is possible to take the channel intervals on the transmission optical fibers 16-1~16-4 wide enough for not receiving any influence of the interaction between the channels, being independent of the amplifying bandwidths of the optical amplifiers 18-1~18-3. Furthermore, since there is no need to expressly expand the amplifying bandwidth of the optical amplifiers 18-1~18-3, each signal light can easily receive regular gain and, as a result, gain equalization becomes unnecessary or easy to apply even if necessary. Consequently, the number of multiplexed wavelengths can be relatively increased and the bandwidth of the amplifier can be used effectively.

In the above-mentioned embodiment, the bandwidth compressor 20 and the bandwidth expander 22 keep the wavelength of at least one signal light without shifting, however, it is also possible to have a structure that the bandwidth compressor 20 and the bandwidth expander 22 can shift all of the signal lights. In such structure, the irregularities of the optical amplifying bandwidths of the optical amplifiers 18-1~18-3, especially the irregularities of the center wavelength, can be compensated by the wavelength converting function of the bandwidth compressor 20 and the bandwidth expander 22.

As readily understandable from the above description, according to the invention, because the transmission bandwidth of the optical fiber transmission line and the amplifying bandwidth of the optical amplifier can be determined separately, it is possible to take the channel intervals on the transmission optical fibers wide enough for not receiving any influence of the interaction between channels, being independent of the amplifying bandwidths of the optical amplifiers. Furthermore, the signal lights can be disposed densely within the amplifying bandwidth of the optical amplifier and, thus, the number of multiplexed wavelengths can be remarkably increased and the bandwidth of the optical amplifier can be used effectively. Moreover, since there is no need to expressly expand the amplifying bandwidth of the optical amplifiers, each signal light can easily receive regular gain and, as a result, gain equalization becomes unnecessary or easy to apply even if necessary.

Further, the irregularities of the optical amplifying bandwidth of the optical amplifier can be easily compensated.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical amplifying transmission system comprising:
    an optical amplifying/repeating means; and
    a plurality of optical fiber transmission lines which are repeated and connected with the optical amplifying/repeating means wherein said optical amplifying/repeating means comprises an optical amplifier, a bandwidth compressor for compressing in an optical frequency domain a bandwidth occupied by an input wavelength-division-multiplexed signal light and applying the compressed signal light to said optical amplifier and a bandwidth expander for expanding the bandwidth occupied by the signal light output from said optical amplifier.

2. The optical amplifying transmission system as defined in claim 1 wherein said bandwidth compressor comprises a divider for dividing said input wavelength-division-multiplexed signal light into a plurality of groups and a relocator for relocating one or more of the groups divided by said divider within a bandwidth narrower than the original bandwidth without overlapping each other.

3. An optical amplifying transmission system comprising:
    a plurality of optical fiber transmission lines which are repeated and connected with optical amplifying/repeating means wherein said optical amplifying/repeating means comprises an optical amplifier, a bandwidth compressor for compressing a bandwidth occupied by an input wavelength-division-multiplexed signal light and applying it to said optical amplifier and a bandwidth expander for expanding the bandwidth occupied by the signal light output from said optical amplifier, wherein said bandwidth compressor comprises a divider for dividing said input wavelength-division-multiplexed signal light into a plurality of groups and a relocator for relocating one or more of the groups divided by said divider within a bandwidth narrower than the original bandwidth without overlapping each other, and wherein said relocator comprises a wavelength converter for wavelength-converting each group in a lump except for at least one group in the plurality of groups divided by said divider and a multiplexer for wavelength-multiplexing both of each group of the signal lights wavelength-converted by the wavelength converter and each group of the signal light which has not wavelength-converted.

4. An optical amplifying transmission system comprising:
    a plurality of optical fiber transmission lines;
    optical amplifying means for optically amplifying a wavelength-division-multiplexed signal light which is transmitted on said optical fiber transmission lines;
    bandwidth expanding means disposed at an input side of said optical fiber transmission lines for expanding a bandwidth occupied by the wavelength-division-multiplexed signal light; and
    bandwidth compressing means disposed at an input side of said optical amplifying means for compressing in an optical frequency domain the bandwidth occupied by the wavelength-division-multiplexed signal light.

5. The optical amplifying transmission system as defined in claim 4 wherein said bandwidth compressing means comprise a divider for dividing a wavelength-division-multiplexed signal light input from the optical fiber transmission line into a plurality of groups and a relocator for relocating one or more of the groups divided by said divider within a bandwidth narrower than the original bandwidth without overlapping each other.

6. An optical amplifying transmission system comprising:
    a plurality of optical fiber transmission lines;
    optical amplifying means for optically amplifying a wavelength-division-multiplexed signal light which is transmitted on said optical fiber transmission lines;
    bandwidth expanding means disposed at an input side of said optical fiber transmission lines for expanding a bandwidth occupied by the wavelength-division-multiplexed signal light; and
    bandwidth compressing means disposed at an input side of said optical amplifying means for compressing the bandwidth occupied by the wavelength-division-multiplexed signal light, wherein said bandwidth compressing means comprise a divider for dividing the wavelength-division-multiplexed signal light input from the optical fiber transmission line into a plurality of groups and a relocator for relocating one or more of the groups divided by said divider within a bandwidth narrower than the original bandwidth without overlapping each other, and wherein said relocator comprises a wavelength converter for wavelength-converting each group in a lump except for at least one group in the plurality of groups divided by said divider and a multiplexer for wavelength-multiplexing both of each group of the signal lights wavelength-converted by the wavelength converter and each group of the signal light which has not wavelength-converted.

7. An optical amplifying apparatus comprising an optical amplifier, a bandwidth compressor for compressing in an optical frequency domain a bandwidth occupied by an input wavelength-division-multiplexed signal light and applying it to said optical amplifier and a bandwidth expander for expanding the bandwidth occupied by the signal light output from said optical amplifier.

8. The optical amplifying apparatus as defined in claim 7 wherein said bandwidth compressor comprises a divider for dividing said input wavelength-division-multiplexed signal light into a plurality of groups and a relocator for relocating one or more of the groups divided by said divider within a bandwidth narrower than the original bandwidth without overlapping each other.

9. An optical amplifying apparatus comprising: an optical amplifier; a bandwidth compressor for compressing a bandwidth occupied by an input wavelength-division-multiplexed signal light and applying it to said optical amplifier; and a bandwidth expander for expanding the bandwidth occupied by the signal light output from said optical amplifier, wherein said bandwidth compressor comprises a divider for dividing said input wavelength-division-multiplexed signal light into a plurality of groups and a relocator for relocating one or more of the groups divided by said divider within a bandwidth narrower than the original bandwidth without overlapping each other, and wherein said relocator comprises a wavelength converter for wavelength-converting each group in a lump except for at least one group in the plurality of groups divided by said divider and a multiplexer for wavelength-multiplexing both of each group of the signal lights wavelength-converted by the wavelength converter and each group of the signal light which has not wavelength-converted.

10. An optical amplifying transmission system comprising a plurality of optical fiber transmission lines, and at least one optical amplifying repeater connecting and repeating the optical fiber transmission lines, each of said at least one optical amplifying repeater comprising an optical amplifier, a bandwidth compressor for compressing in an optical frequency domain a bandwidth occupied by a wavelength-division-multiplexed signal light input from one of the optical fiber transmission lines and applying it to said optical amplifier, and a bandwidth expander for expanding the compressed bandwidth occupied by signal light output from said optical amplifier.

11. The optical amplifying transmission system as defined in claim 10 wherein said bandwidth compressor comprises a divider for dividing said wavelength-division-multiplexed signal light into a plurality of groups of signal lights, and a relocator for relocating at least one of the groups such that all of the groups are within a bandwidth narrower than the bandwidth occupied by the wavelength-division-multiplexed signal light without the groups overlapping each other.

12. An optical amplifying transmission system comprising: a plurality of optical fiber transmission lines; and at least one optical amplifying repeater connecting and repeating the optical fiber transmission lines, said at least one optical amplifying repeater comprising an optical amplifier, a bandwidth compressor for compressing a bandwidth occupied by a wavelength-division-multiplexed signal light input from one of the optical fiber transmission lines and applying it to said optical amplifier, and a bandwidth expander for expanding the compressed bandwidth occupied by signal light output from said optical amplifier, wherein said bandwidth compressor comprises a divider for dividing said wavelength-division-multiplexed signal light into a plurality of groups of signal lights, and a relocator for relocating at least one of the groups such that all of the groups are within a bandwidth narrower than the bandwidth occupied by the wavelength-division-multiplexed signal light without the groups overlapping each other, and wherein said relocator comprises a wavelength converter for wavelength-converting said at least one of the groups, and a multiplexer for wavelength-multiplexing both said at least one of the groups wavelength-converted and each group not wavelength-converted.

13. An optical amplifying transmission system comprising:
a plurality of optical fiber transmission lines for transmitting a wavelength-division-multiplexed signal light;
an optical amplifier for optically amplifying said wavelength-division multiplexed signal light, said optical amplifier having an input and an output;
a bandwidth expander, disposed at the output of the optical amplifier, for expanding a bandwidth occupied by signal light output from said optical amplifier; and
a bandwidth compressor, disposed at the input of said optical amplifier, for compressing in an optical frequency domain the bandwidth occupied by the wavelength-division-multiplexed signal light.

14. The optical amplifying transmission system as defined in claim 13 wherein said bandwidth compressor comprises a divider for dividing said wavelength-division-multiplexed signal light into a plurality of groups, and a relocator for relocating at least one of the groups such that all of the groups are within a bandwidth narrower than the bandwidth of said wavelength-division-multiplexed signal light without the groups overlapping each other.

15. An optical amplifying transmission system comprising:
a plurality of optical fiber transmission lines for transmitting a wavelength-division-multiplexed signal light;
an optical amplifier for optically amplifying said wavelength-division multiplexed signal light, said optical amplifier having an input and an output;
a bandwidth expander, disposed at the output of the optical amplifier, for expanding a bandwidth occupied by signal light output from said optical amplifier; and
a bandwidth compressor, disposed at the input of said optical amplifier, for compressing the bandwidth occupied by the wavelength-division-multiplexed signal light, wherein said bandwidth compressor comprises a divider for dividing said wavelength-division-multiplexed signal light into a plurality of groups, and a relocator for relocating at least one of the groups such that all of the groups are within a bandwidth narrower than the bandwidth of said wavelength-division-multiplexed signal light without the groups overlapping each other, and wherein said relocator comprises a wavelength converter for wavelength-converting said at least one of the groups, and a multiplexer for wavelength-multiplexing both said at least one of the groups wavelength-converted and each group not wavelength-converted.

16. An optical amplifying apparatus comprising an optical amplifier, a bandwidth compressor for compressing in an optical frequency domain a bandwidth occupied by a wavelength-division-multiplexed signal light and applying it to said optical amplifier, and a bandwidth expander for expanding the compressed bandwidth occupied by signal light output from said optical amplifier.

17. The optical amplifying apparatus as defined in claim 16 wherein said bandwidth compressor comprises a divider for dividing said wavelength-division-multiplexed signal light into a plurality of groups, and a relocator for relocating at least one of the groups such that all the groups are within a bandwidth narrower than the bandwidth of the wavelength-division-muitiplexed signal light without the groups overlapping each other.

18. An optical amplifying apparatus comprising an optical amplifier, a bandwidth compressor for compressing a bandwidth occupied by a wavelength-division-multiplexed signal light and applying it to said optical amplifier, and a bandwidth expander for expanding the compressed bandwidth occupied by signal light output from said optical amplifier, wherein said bandwidth compressor comprises a divider for dividing said wavelength-division-multiplexed signal light into a plurality of groups, and a relocator for relocating at least one of the groups such that all the groups are within a bandwidth narrower than the bandwidth of the wavelength-division-multiplexed signal light without the groups overlapping each other, and wherein said relocator comprises a wavelength converter for wavelength-converting said at least one of the groups, and a multiplexer for wavelength-multiplexing both the said at least one of the groups wavelength-converted and each group not wavelength-converted.

* * * * *

UNITED STATES PATENT AND TRADEMARK OFFICE
CERTIFICATE OF CORRECTION

PATENT NO. : 6,504,638 B1
DATED : January 7, 2003
INVENTOR(S) : Keiji Tanaka et al.

It is certified that error appears in the above-identified patent and that said Letters Patent is hereby corrected as shown below:

<u>Column 8,</u>
Line 65, replace "wavelength-division-muitiplexed" with -- wavelength-division-multiplexed --.

Signed and Sealed this

Twentieth Day of April, 2004

JON W. DUDAS
*Acting Director of the United States Patent and Trademark Office*